(12) United States Patent
Wakimoto et al.

(10) Patent No.: US 10,833,372 B2
(45) Date of Patent: Nov. 10, 2020

(54) RECTANGULAR SECONDARY BATTERY

(71) Applicant: SANYO Electric Co., Ltd., Daito (JP)

(72) Inventors: Ryoichi Wakimoto, Hyogo (JP);
Hiroshi Takabayashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 227 days.

(21) Appl. No.: 16/012,173

(22) Filed: Jun. 19, 2018

(65) Prior Publication Data

US 2018/0375162 A1    Dec. 27, 2018

(30) Foreign Application Priority Data

Jun. 26, 2017  (JP) ................. 2017-124282

(51) Int. Cl.
| | |
|---|---|
| *H01M 10/28* | (2006.01) |
| *H01M 4/525* | (2010.01) |
| *H01M 4/505* | (2010.01) |
| *H01M 4/62* | (2006.01) |
| *H01M 2/26* | (2006.01) |
| *H01M 2/08* | (2006.01) |
| *H01M 4/66* | (2006.01) |
| *H01M 2/30* | (2006.01) |

(Continued)

(52) U.S. Cl.
CPC ......... *H01M 10/28* (2013.01); *H01M 2/0237* (2013.01); *H01M 2/08* (2013.01); *H01M 2/22* (2013.01); *H01M 2/26* (2013.01); *H01M 2/263* (2013.01); *H01M 2/30* (2013.01); *H01M 2/305* (2013.01); *H01M 2/34* (2013.01); *H01M 4/505* (2013.01); *H01M 4/525* (2013.01); *H01M 4/623* (2013.01); *H01M 4/661* (2013.01); *H01M 10/052* (2013.01); *H01M 10/0587* (2013.01); *H01M 10/286* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2009/0004561 A1 | 1/2009 | Nansaka et al. |
| 2009/0239133 A1 | 9/2009 | Kosugi |
| 2015/0327353 A1* | 11/2015 | Dickover ............ H01L 23/4338 361/679.54 |

FOREIGN PATENT DOCUMENTS

| | | |
|---|---|---|
| JP | 2008-226625 A | 9/2008 |
| JP | 2009-32640 A | 2/2009 |

(Continued)

*Primary Examiner* — Wyatt P McConnell
(74) *Attorney, Agent, or Firm* — Westerman, Hattori, Daniels & Adrian, LLP

(57) ABSTRACT

An electrode body, which includes a positive electrode plate and a negative electrode plate, is contained in a battery case, which is composed of a rectangular casing and a sealing plate. A first positive-electrode tab group, which is composed of a plurality of positive electrode tabs, and a second positive-electrode tab group, which is composed of a plurality of positive electrode tabs, are disposed between the sealing plate and the electrode body. The first positive-electrode tab group and the second positive-electrode tab group are disposed so as to be displaced from each other in the longitudinal direction of the sealing plate. The first positive-electrode tab group and the second positive-electrode tab group are connected to different positions on a positive-electrode current collector.

8 Claims, 10 Drawing Sheets

(51) Int. Cl.
*H01M 2/22* (2006.01)
*H01M 2/34* (2006.01)
*H01M 2/02* (2006.01)
H01M 4/02 (2006.01)
H01M 10/052 (2010.01)
H01M 10/0587 (2010.01)

(56) References Cited

FOREIGN PATENT DOCUMENTS

| WO | 2017045775 A1 | 3/2017 |
| WO | 2017045815 A1 | 3/2017 |

\* cited by examiner

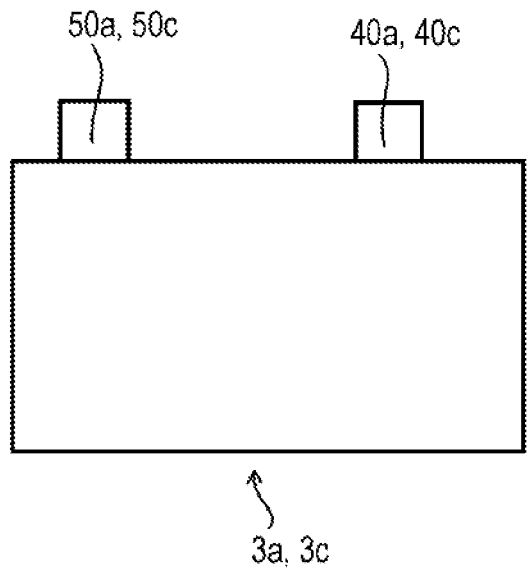
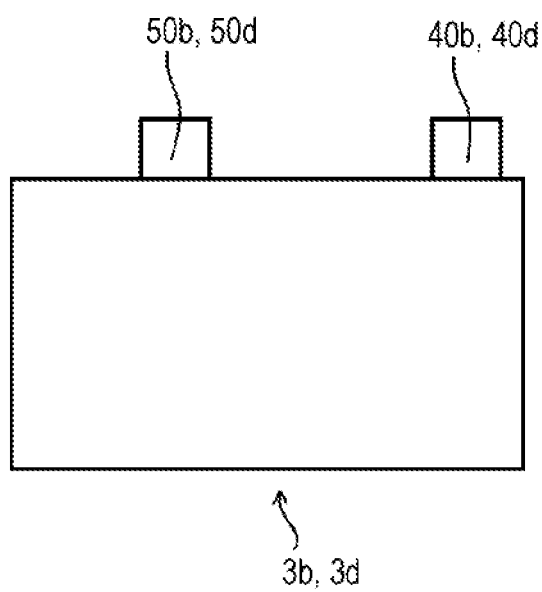

RECTANGULAR SECONDARY BATTERY

CROSS REFERENCE TO RELATED APPLICATIONS

The present invention application claims priority to Japanese Patent Application No. 2017-124282 filed in the Japan Patent Office on Jun. 26, 2017, the entire contents of which are incorporated herein by reference.

BACKGROUND OF THE INVENTION

Field of the Invention

The present invention relates to a rectangular secondary battery.

Description of Related Art

Rectangular secondary batteries, such as alkaline secondary batteries and non-aqueous electrolyte secondary batteries, are used as driving electric power sources of electric vehicles (EV), hybrid electric vehicles (HEV, PHEV), and the like.

The rectangular secondary batteries each have a battery case that is composed of a rectangular casing, which has an opening and a bottomed-rectangular-tubular shape, and a sealing plate that seals the opening. The battery case contains an electrode body together with an electrolyte. The electrode body is composed of a positive electrode plate, a negative electrode plate, and a separator. A positive electrode terminal and a negative electrode terminal are attached to the sealing plate. The positive electrode terminal is electrically connected to the positive electrode plate via a positive-electrode current collector, and the negative electrode terminal is electrically connected to the negative electrode plate via a negative-electrode current collector.

The positive electrode plate includes a positive electrode core, which is made of a metal, and a positive-electrode-active-material mixture layer, which is formed on a surface of the positive electrode core. The positive electrode core has a positive-electrode-core exposed portion, on which the positive-electrode-active-material mixture layer is not formed. A positive-electrode current collector is connected to the positive-electrode-core exposed portion. The negative electrode plate includes a negative electrode core, which is made of a metal, and a negative-electrode-active-material mixture layer, which is formed on a surface of the negative electrode core. The negative electrode core has a negative-electrode-core exposed portion, on which the negative-electrode-active-material mixture layer is not formed. A negative-electrode current collector is connected to the negative-electrode-core exposed portion.

For example, Japanese Published Unexamined Patent Application No. 2009-032640 (Patent Document 1) describes a rectangular secondary battery including a rolled electrode body having a rolled positive-electrode-core exposed portion at one end thereof and a rolled negative-electrode-core exposed portion at the other end thereof.

Japanese Published Unexamined Patent Application No. 2008-226625 (Patent Document 2) describes a rectangular secondary battery including an electrode body having a positive-electrode-core exposed portion and a negative-electrode-core exposed portions at one end thereof.

Regarding secondary batteries used for vehicles, in particular, EVs and PHEVs, it is desirable to develop a secondary battery having higher volumetric energy density and larger battery capacity. In the rectangular secondary battery described in Patent Document 1, the inside of the battery case needs to have left and right spaces, for disposing the rolled positive-electrode-core exposed portion and the rolled negative-electrode-core exposed portion, and an upper space between the sealing plate and the rolled electrode body. For this reason, it is difficult to increase the volumetric energy density of the secondary battery.

In contrast, as in the secondary battery described in Patent Document 2, by using an electrode body having a positive electrode exposed core and a negative electrode exposed core at one end thereof, a rectangular secondary battery having high volumetric energy density can be easily obtained.

BRIEF SUMMARY OF THE INVENTION

An object of the present invention is to provide a rectangular secondary battery having high volumetric energy density and higher reliability.

A rectangular secondary battery according to an aspect of the present invention includes a rectangular casing that has an opening, a sealing plate that seals the opening, an electrode body that is disposed in the rectangular casing and that includes a positive electrode plate and a negative electrode plate, a tab that is connected to the positive electrode plate or the negative electrode plate, a current collector that is connected to the tab, and a terminal that is electrically connected to the current collector and that protrudes from the sealing plate toward an outside of the battery. A first tab group that is composed of a plurality of the tabs and a second tab group that is composed of a plurality of the tabs are connected to the electrode body. The first tab group and the second tab group are disposed between the sealing plate and the electrode body. The first tab group and the second tab group are disposed so as to be displaced from each other in a longitudinal direction of the sealing plate. The first tab group and the second tab group are connected to different positions on the current collector.

In the rectangular secondary battery according to the aspect of the present invention, the first tab group and the second tab group are disposed between the sealing plate and the electrode body. This structure allows the rectangular secondary battery to easily have higher volumetric energy density. Moreover, the first tab group and the second tab group are disposed so as to be displaced from each other, and the first tab group and the second tab group are connected to different positions. Therefore, the number of tabs that are stacked and connected at one time can be reduced, and thus a joint between the tab group and the current collector can be more stably reinforced. Thus, the rectangular secondary battery can have higher reliability.

Preferably, the electrode body includes a first electrode body element and a second electrode body element, the first tab group is connected to the first electrode body element, and the second tab group is connected to the second electrode body element. This structure allows each of the first tab group and the second tab group to be easily bundled.

Preferably, the first electrode body element and the second electrode body element are each a rolled electrode body element in which a positive electrode plate having a strip-like shape and a negative electrode plate having strip-like shape are rolled up with a separator having a strip-like shape therebetween. This structure allows each of the first tab group and the second tab group to be easily bundled.

Preferably, the tab is a negative electrode tab that is connected to the negative electrode plate, and, in the first electrode body element, the number of the negative electrode tabs that are stacked and included in the first tab group is less than the number of layers of the negative electrode plate that are stacked in a thickness direction of the first electrode body element. This structure allows a joint between the negative-electrode tab group and the negative-electrode current collector to be more stably reinforced.

Preferably, the electrode body further includes a third electrode body element that is a rolled electrode body element to which a third tab group is connected and a fourth electrode body element that is a rolled electrode body element to which a fourth tab group is connected, the third tab group is superposed on the first tab group and connected to the current collector, and the fourth tab group is superposed on the second tab group and connected to the current collector. This structure allows the space in the battery to be more efficiently used when each of the electrode body elements is a rolled electrode body element, and the rectangular secondary battery can have higher volumetric energy.

Preferably, a fuse portion is formed between a portion of the current collector connected to the terminal and a portion of the current collector connected to the first tab group, and a fuse portion is formed between the portion of the current collector connected to terminal and a portion of the current collector connected to the second tab group.

Preferably, the terminal includes a flange portion and an insertion portion disposed on the flange portion, the flange portion is disposed nearer than the sealing plate to the electrode body, the insertion portion extends through a terminal attachment hole in the sealing plate and is upset at a position further outward from the sealing plate with respect to the battery, and the current collector is connected to a surface of the flange portion facing the electrode body.

Preferably, the current collector includes a base portion and a tab connection portion that is folded from an end of the base portion, and the base portion and the terminal are connected to each other, and the tab connection portion and the tab are connected to each other.

The present invention can provide a rectangular secondary battery having higher volumetric energy density and higher reliability.

BRIEF DESCRIPTION OF THE SEVERAL VIEWS OF THE DRAWINGS

FIGS. 5A and 5B are plan views of an electrode body element according to the embodiment;

DETAILED DESCRIPTION OF THE INVENTION

Hereinafter, the structure of a rectangular secondary battery 20 according to an embodiment will be described. Note that the present invention is not limited to the embodiment described below.

Figure 1:
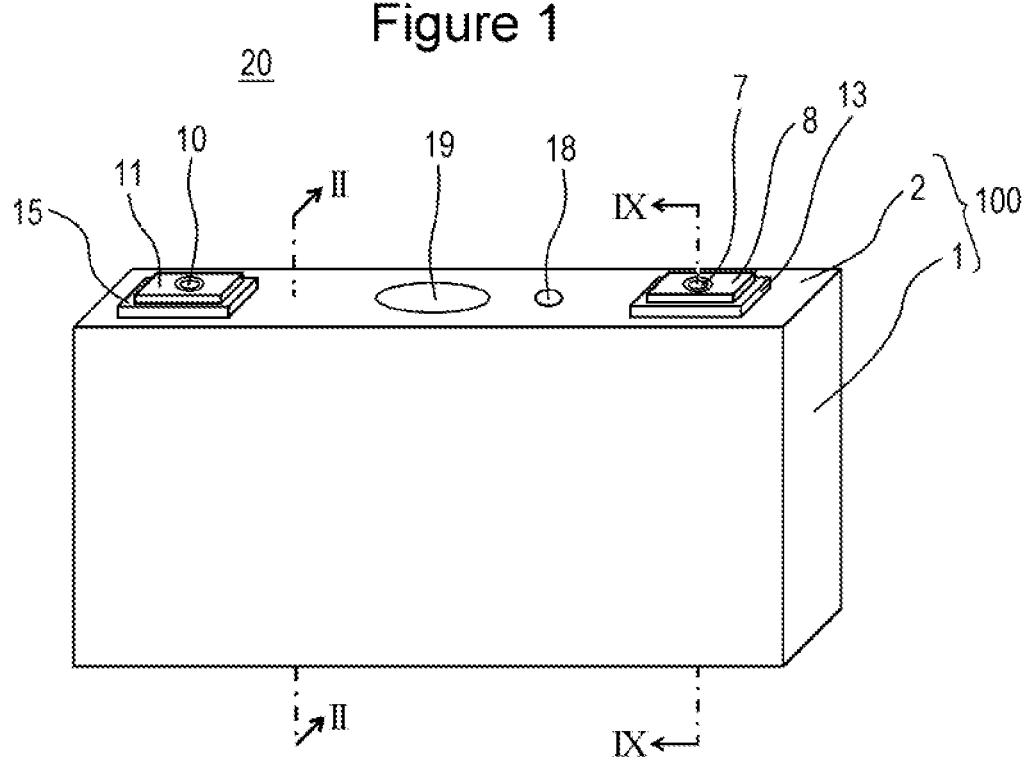
FIG. 1 is a perspective view of a rectangular secondary battery according to an embodiment.
Figure 2:
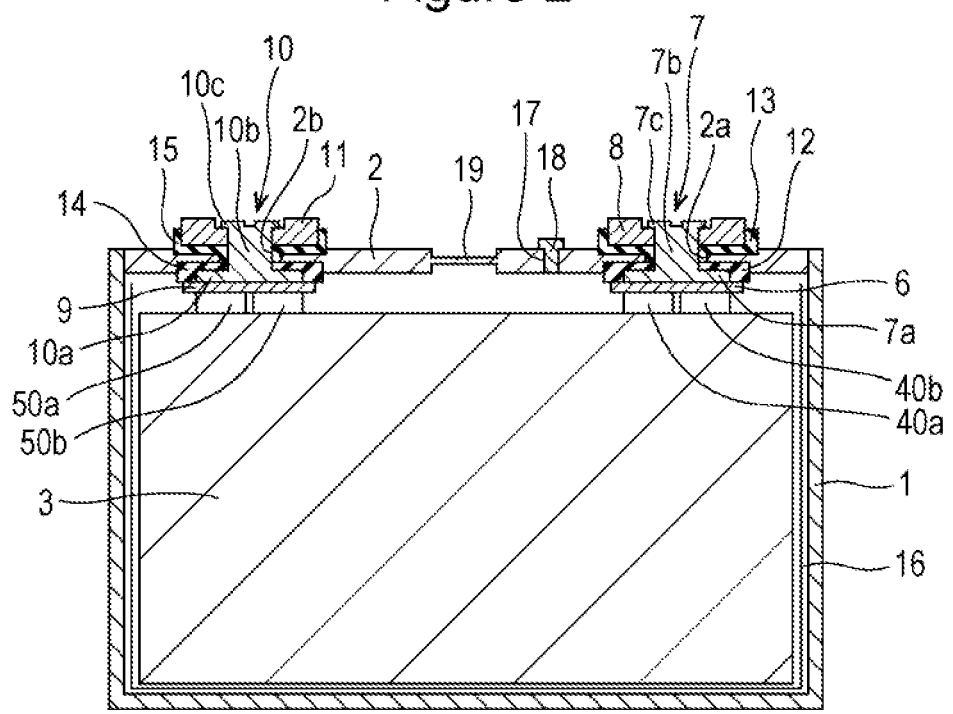
FIG. 2 is a sectional view taken along line II-II of FIG. 1.

As illustrated in FIGS. 1 and 2, the rectangular secondary battery 20 includes a battery case 100 that is composed of a rectangular casing 1, which has an opening and a bottomed-rectangular-tubular shape, and a sealing plate 2 that seals the opening of the rectangular casing 1. Preferably, the rectangular casing 1 and the sealing plate 2 are each made of a metal, such as aluminum or an aluminum alloy. The rectangular casing 1 contains an electrode body 3 together with an electrolyte. The electrode body 3 includes a positive electrode plate and a negative electrode plate. An insulating sheet 16 is disposed between the electrode body 3 and the rectangular casing 1.

A first positive-electrode tab group 40a, a second positive-electrode tab group 40b, a first negative-electrode tab group 50a, and a second negative-electrode tab group 50b are disposed at an end of the electrode body 3 adjacent to the sealing plate 2. The first positive-electrode tab group 40a and the second positive-electrode tab group 40b are electrically connected to a positive electrode terminal 7 via a positive-electrode current collector 6. The positive electrode terminal 7 extends through the sealing plate 2 and is connected to a positive-electrode outer conductor 8, which is disposed on the outer side of the sealing plate 2. The first negative-electrode tab group 50a and the second negative-electrode tab group 50b are electrically connected to a negative electrode terminal 10 via a negative-electrode current collector 9. The negative electrode terminal 10 extends through the sealing plate 2 and is connected to a negative-electrode outer conductor 11, which is disposed on the outer side of the sealing plate 2.

A flange portion 7a of the positive electrode terminal 7 is disposed nearer than the sealing plate 2 to the electrode body 3. An insertion portion 7b of the positive electrode terminal 7 is inserted, from the electrode body 3 side, into a positive-electrode-terminal attachment hole 2a in the sealing plate 2, and a through-hole in the positive-electrode outer conductor 8. An end portion of the insertion portion 7b is upset on the positive-electrode outer conductor 8. An upset portion 7c is formed by upsetting the end portion of the positive electrode terminal 7. A flange portion 10a of the negative electrode terminal 10 is disposed nearer than the sealing plate 2 to the electrode body 3. An insertion portion 10b of the negative electrode terminal 10 is inserted, from the electrode body 3 side, into a negative-electrode-terminal attachment hole 2b in the sealing plate 2, and a through-hole of the negative-electrode outer conductor 11. An end portion of the insertion portion 10b is upset on the negative-electrode outer conductor 11. An upset portion 10c is formed by upsetting the end portion of the negative electrode terminal 10. An inner insulator 12, which is made of a resin, is disposed between the sealing plate 2 and the positive electrode terminal 7. An outer insulator 13, which is made of a resin, is disposed between the sealing plate 2 and the positive-electrode outer conductor 8. An inner insulator 14, which is made of a resin, is disposed between the sealing plate 2 and the negative electrode terminal 10. An outer insulator 15, which is made of a resin, is disposed between the sealing plate 2 and the negative-electrode outer conductor 11.

The positive-electrode current collector 6, the positive electrode terminal 7, and the positive-electrode outer conductor 8 are each made of, preferably, a metal, and more preferably, aluminum or an aluminum alloy.

Preferably, the negative-electrode current collector 9, the negative electrode terminal 10, and the negative-electrode outer conductor 11 are each made of a metal. Preferably, the negative-electrode current collector 9 is made of copper or a copper alloy. A nickel layer may be formed on a surface of the negative-electrode current collector 9. Preferably, the negative electrode terminal 10 is made of copper, a copper alloy, aluminum, or an aluminum alloy. A nickel layer may be formed on a surface of the negative electrode terminal 10. Preferably, the negative-electrode outer conductor 11 is made of copper, a copper alloy, aluminum, or an aluminum alloy. A nickel layer may be formed on a surface of the negative-electrode outer conductor 11.

Particularly preferably, the negative electrode terminal 10 is made of at least two types of metals, a part of the negative electrode terminal 10 inside the battery is made of copper or a copper alloy, and a part of the negative electrode terminal 10 outside the battery is made of aluminum or an aluminum alloy. Preferably, the negative-electrode outer conductor 11 made of aluminum or an aluminum alloy is connected to a part of the negative electrode terminal 10 made of aluminum or an aluminum alloy. Preferably, the negative-electrode current collector 9 made of copper or a copper alloy is connected to a part of the negative electrode terminal 10 made of copper or a copper alloy.

The sealing plate 2 has a liquid injection hole 17. After injecting an electrolyte solution into the battery case 100 from the liquid injection hole 17, the liquid injection hole 17 is sealed with a sealing plug 18.

The sealing plate 2 has a gas discharge valve 19 that breaks and discharges a gas from the inside to the outside of the battery case 100 if the pressure inside the battery case 100 becomes a predetermined pressure or higher.

Next, a method of manufacturing the rectangular secondary battery 20 will be described.

Production of Positive Electrode Plate

Positive electrode slurry including the following substances is prepared: a lithium-nickel-cobalt-manganese composite oxide, as a positive electrode active material; a polyvinylidene fluoride (PVdF), as a binder; a carbon material, as a conducting material; and an N-methyl-2-pyrrolidone (NMP), as a dispersion medium. The positive electrode slurry is applied to both surfaces of a strip-shaped aluminum foil having a thickness of 15 µm, which is a positive electrode core. By removing NMP from the positive electrode slurry by drying the slurry, positive-electrode-active-material mixture layers are formed on the positive electrode core. Subsequently, the positive-electrode-active-material mixture layers are compressed to have a predetermined thickness. A positive electrode plate, obtained as described above, is cut into a predetermined shape.

Figure 3:
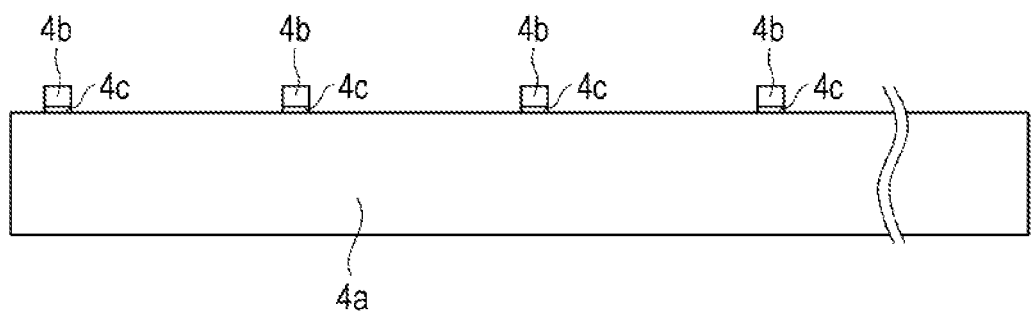
FIG. 3 is a plan view of a positive electrode plate according to the embodiment.

FIG. 3 is a plan view of a positive electrode plate 4 produced by using the method described above. As illustrated in FIG. 3, the positive electrode plate 4 has a body in which positive-electrode-active-material mixture layers 4a are formed on both surfaces of the positive electrode core. A plurality of positive electrode tabs 4b are arranged at intervals at an end of the positive electrode plate 4 in the width direction. Preferably, the positive electrode tabs 4b are each a part of the positive electrode core.

Preferably, a positive electrode protection layer 4c is formed on a part of the positive electrode core near the base of each of the positive electrode tabs 4b. The positive electrode protection layer 4c is a layer having a lower electroconductivity than the positive-electrode-active-material mixture layer 4a. Preferably, the positive electrode protection layer 4c includes ceramic particles, which are made of alumina, silica, zirconia, or the like; and a binder. The positive electrode protection layer 4c may include electroconductive particles made of a carbon material or the like.

Production of Negative Electrode Plate

Negative electrode slurry including the following substances is prepared: graphite, as a negative electrode active material; styrene-butadiene rubber (SBR), as a binder; carboxymethyl cellulose (CMC), as a thickener; and water. The negative electrode slurry is applied to both surfaces of a strip-shaped copper foil having a thickness of 8 µm, which is a negative electrode core. By removing water in the negative electrode slurry by drying the negative electrode slurry, negative-electrode-active-material mixture layers are formed on the negative electrode core. Subsequently, the negative-electrode-active-material mixture layers are compressed to have a predetermined thickness. A negative electrode plate, obtained as described above, is cut into a predetermined shape.

Figure 4:
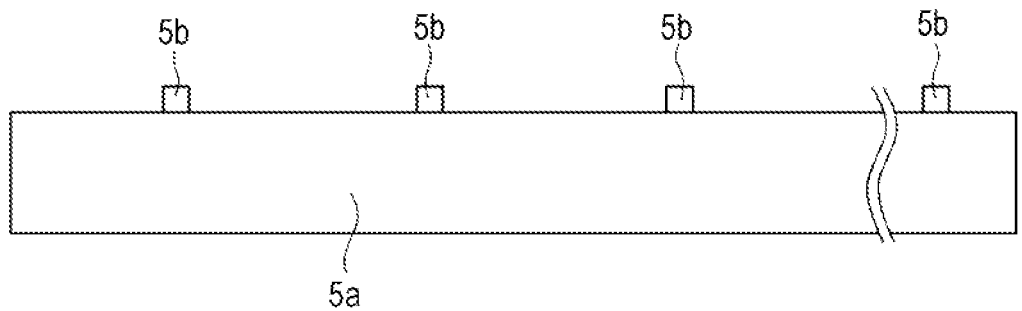
FIG. 4 is a plan view of a negative electrode plate according to the embodiment.

FIG. 4 is a plan view of a negative electrode plate 5 produced by using the method described above. As illustrated in FIG. 4, the negative electrode plate 5 has a body in which negative-electrode-active-material mixture layers 5a are formed on both surfaces of the negative electrode core. A plurality of negative electrode tabs 5b are arranged at intervals at an end of the negative electrode plate 5 in the width direction. Preferably, the negative electrode tabs 5b are each a part of the negative electrode core.

Production of Electrode Body Element

A rolled electrode body element is produced by rolling up the positive electrode plate 4 and the negative electrode plate 5, which have been produced by using the methods described above, with a strip-shaped polyolefin separator therebetween. FIG. 5A is a plan view of a first electrode body element 3a and a third electrode body element 3c, each of which is a rolled element. FIG. 5B is a plan view of a second electrode body element 3b and a fourth electrode body element 3d, each of which is a rolled element. The first electrode body element 3a includes the first positive-electrode tab group 40a, composed of the plurality of positive electrode tabs 4b, and the first negative-electrode tab group 50a, composed of the plurality of negative electrode tabs 5b, at one end thereof. The second electrode body element 3b includes the second positive-electrode tab group 40b, composed of the plurality of positive electrode tabs 4b, and the second negative-electrode tab group 50b, composed of the plurality of negative electrode tabs 5b, at one end thereof. By changing the positions where the positive electrode tabs and the negative electrode tabs are formed in the positive electrode plate and the negative electrode plate used for the electrode body elements, the positions of the positive-electrode tab groups and the negative-electrode tab groups on the electrode body elements can be changed.

Assembly of Sealing Plate

Figure 6:
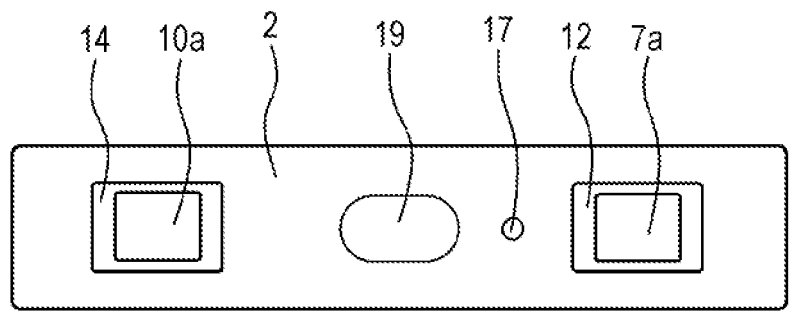
FIG. 6 illustrates a surface of a sealing plate facing the electrode body, after components have been attached.

Referring to FIGS. 2 and 6, a method of attaching the positive electrode terminal 7, the positive-electrode outer conductor 8, the negative electrode terminal 10, and the negative-electrode outer conductor 11 to the sealing plate 2 will be described. The outer insulator 13 and the positive-electrode outer conductor 8 are placed on a part of the outer surface of the sealing plate 2 around the positive-electrode-terminal attachment hole 2a, and the inner insulator 12 is placed on a part of the inner surface of the sealing plate 2 around the positive-electrode-terminal attachment hole 2a. Next, the insertion portion 7b of the positive electrode terminal 7 is inserted into the through-hole in the inner insulator 12, the positive-electrode-terminal attachment hole 2a in the sealing plate 2, the through-hole in the outer insulator 13, and the through-hole in the positive-electrode outer conductor 8. Then, the end portion of the insertion portion 7b is upset on the positive-electrode outer conductor 8. Thus, the positive electrode terminal 7, the inner insulator 12, the outer insulator 13, and the positive-electrode outer conductor 8 are attached to the sealing plate 2. Preferably, the upset portion 7c of the positive electrode terminal 7 and the positive-electrode outer conductor 8 are welded to each other by laser welding or the like.

The outer insulator 15 and the negative-electrode outer conductor 11 are placed on a part of the outer surface of the sealing plate 2 around the negative-electrode-terminal attachment hole 2b, and the inner insulator 14 is placed on a part of the inner surface of the sealing plate 2 around the negative-electrode-terminal attachment hole 2b. Next, the insertion portion 10b of the negative electrode terminal 10 is inserted into the through-hole in the inner insulator 14, the negative-electrode-terminal attachment hole 2b in the sealing plate 2, the through-hole in the outer insulator 15, and the through-hole in the negative-electrode outer conductor 11. Then, the end portion of the insertion portion 10b is upset on the negative-electrode outer conductor 11. Thus, the negative electrode terminal 10, the inner insulator 14, the outer insulator 15, and the negative-electrode outer conductor 11 are attached to the sealing plate 2. Preferably, the upset portion 10c of the negative electrode terminal 10 and the negative-electrode outer conductor 11 are welded to each other by laser welding or the like.

Electrode Body

Figure 7:
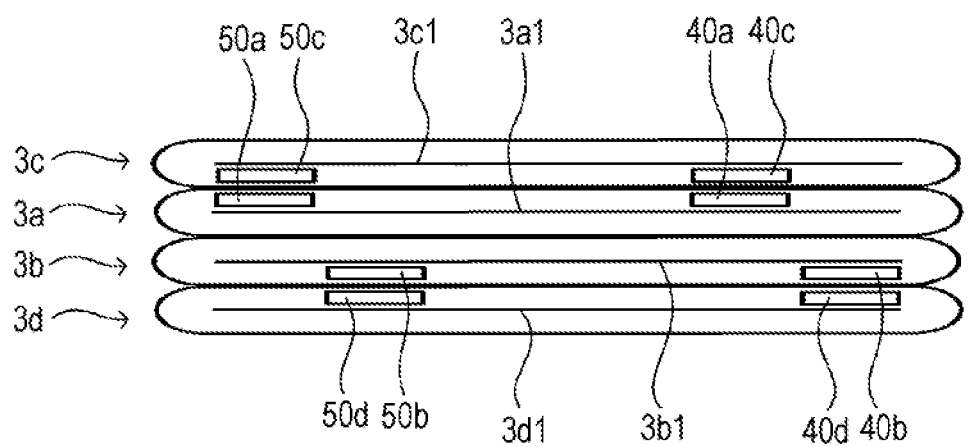
FIG. 7 illustrates the surface of the electrode body according to the embodiment, on which tab groups are disposed.

FIG. 7 illustrates a surface of the electrode body 3 on which tab groups are disposed. The electrode body 3 is formed by stacking the first electrode body element 3a, the second electrode body element 3b, the third electrode body element 3c, and the fourth electrode body element 3d. The stacked electrode body elements need not be fixed to each other. However, the stacked electrode body elements may be fixed to each other by using an adhesive layer, a tape, or the like.

In the first electrode body element 3a, the first positive-electrode tab group 40a and the first negative-electrode tab group 50a are formed at positions on one side (the upper side in FIG. 7) of a first roll-center portion 3a1 of the first electrode body element 3a in the thickness direction of the first electrode body element 3a. In the second electrode body element 3b, the second positive-electrode tab group 40b and the second negative-electrode tab group 50b are formed at positions on the other side (the lower side in FIG. 7) of a second roll-center portion 3b1 of the second electrode body element 3b in the thickness direction of the second electrode body element 3b. In the third electrode body element 3c, a third positive-electrode tab group 40c and a third negative-electrode tab group 50c are formed at positions on the other side (the lower side in FIG. 7) of a third roll-center portion 3c1 of the third electrode body element 3c in the thickness direction of the third electrode body element 3c. In the fourth electrode body element 3d, a fourth positive-electrode tab group 40d and a fourth negative-electrode tab group 50d are formed at positions on the one side (the upper side in FIG. 7) of a fourth roll-center portion 3d1 of the fourth electrode body element 3d in the thickness direction of the fourth electrode body element 3d.

In the electrode body 3, the first positive-electrode tab group 40a and the third positive-electrode tab group 40c, the second positive-electrode tab group 40b and the fourth positive-electrode tab group 40d, the first negative-electrode tab group 50a and the third negative-electrode tab group 50c, and the second negative-electrode tab group 50b and the fourth negative-electrode tab group 50d are respectively disposed at adjacent positions.

Preferably, in each electrode body element, the distance between the positive-electrode tab group and the negative-electrode tab group is large. Accordingly, in the first electrode body element 3a and the second electrode body element 3b, the first positive-electrode tab group 40a and the first negative-electrode tab group 50a are formed so as to be respectively displaced from the second positive-electrode tab group 40b and the second negative-electrode tab group 50b in the same direction (leftward in FIG. 7).

In a rolled electrode body element, if the positive-electrode tab group and the negative-electrode tab group are formed only on one side of the roll-center portion, the number of tab groups that are stacked and connected to the current collector can be reduced. Thus, the tab groups can be more easily and reliably welded to the current collectors. Preferably, in the thickness direction of the electrode body element, the number of positive electrode tabs is less than the number of layers of the positive electrode plate that are stacked. Preferably, the ratio of the number of positive electrode tabs to the number of layers of the positive electrode plate that are stacked is 0.6 or lower, and more preferably, 0.5 or lower. The same applies to the negative electrode side.

Connection of Tab Groups and Current Collectors

Figure 8:
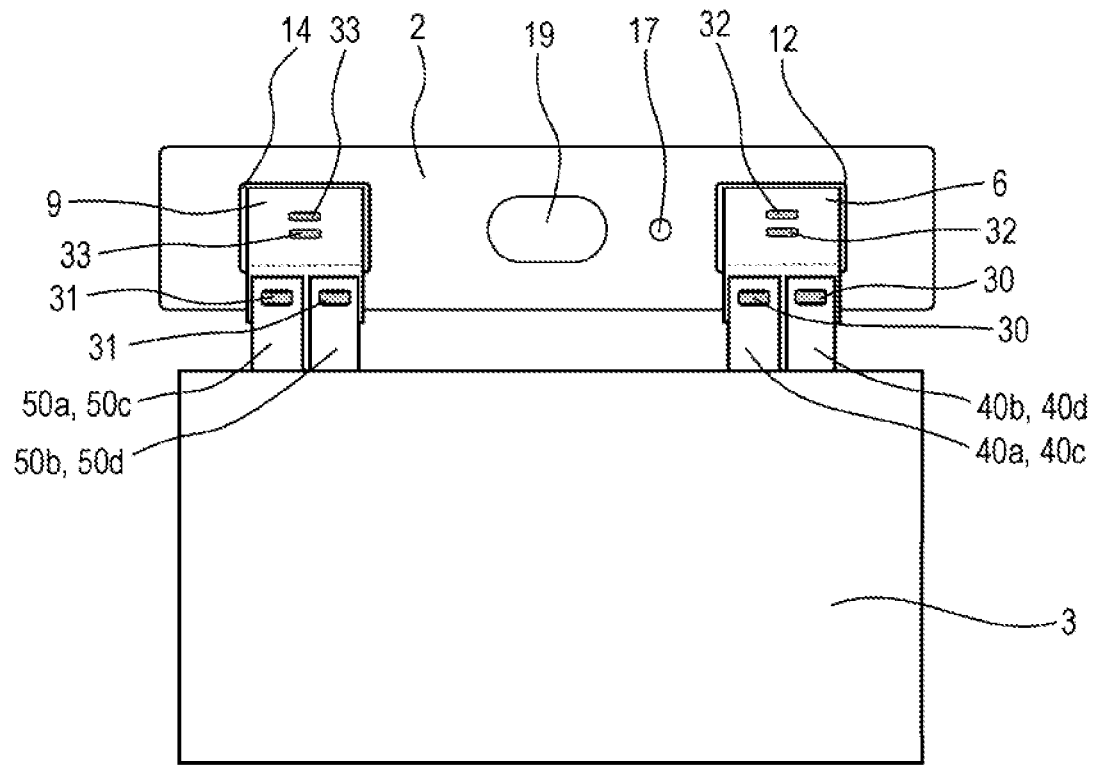
FIG. 8 illustrates the surface of the sealing plate facing the electrode body, after the electrode body has been attached.

As illustrated in FIG. 8, the first positive-electrode tab group 40a of the first electrode body element 3a and the third positive-electrode tab group 40c of the third electrode body element 3c are bundled and welded to the positive-electrode current collector 6. The second positive-electrode tab group 40b of the second electrode body element 3b and the fourth positive-electrode tab group 40d of the fourth electrode body element 3d are bundled and welded to the positive-electrode current collector 6. Thus, joints 30 is formed. The first negative-electrode tab group 50a of the first electrode body element 3a and the third negative-electrode tab group 50c of the third electrode body element 3c are bundled and welded to the negative-electrode current collector 9. The second negative-electrode tab group 50b of the second electrode body element 3b and the fourth negative-electrode tab group 50d of the fourth electrode body element 3d are bundled and welded to the negative-electrode current collector 9. Thus, joints 31 are formed. Preferably, welding is performed by ultrasonic welding or resistance welding.

Connection of Terminals and Current Collectors

As illustrated in FIG. 8, the positive-electrode current collector 6 is welded to the flange portion 7a of the positive electrode terminal 7. Thus, joints 32 are formed. The negative-electrode current collector 9 is welded to the flange portion 10a of the negative electrode terminal 10. Thus, joints 33 are formed. Preferably, welding is performed by energy beam welding, such as laser welding. Preferably, the joints 32 and the joints 33 are respectively formed at a plurality of positions. However, the number of the joints 32 and the number of the joints 33 may each be one.

Next, bending of the positive-electrode current collector 6 and the negative-electrode current collector 9 is performed. Thus, the positive-electrode current collector 6 and the negative-electrode current collector 9 are folded, and the positive-electrode tab groups and the negative-electrode tab groups are bent.

After connecting the positive-electrode current collector 6 to the positive electrode terminal 7, the positive-electrode tab groups may be connected to the positive-electrode current collector 6. After connecting the negative-electrode current collector 9 to the negative electrode terminal 10, the negative-electrode tab groups may be connected to the negative-electrode current collector 9. In this case, the positive-electrode current collector 6 and the negative-electrode current collector 9, which have been bent, may be connected to the positive electrode terminal 7 and the negative electrode terminal 10.

The electrode body 3 is placed in the insulating sheet 16 having a box-like shape, which has been formed by bending a resin sheet. The electrode body 3, wrapped in the insulating sheet 16, is inserted into the rectangular casing 1. Subsequently, the opening of the rectangular casing 1 is sealed by welding the outer edge of the sealing plate 2 to the rectangular casing 1.

Figure 9:
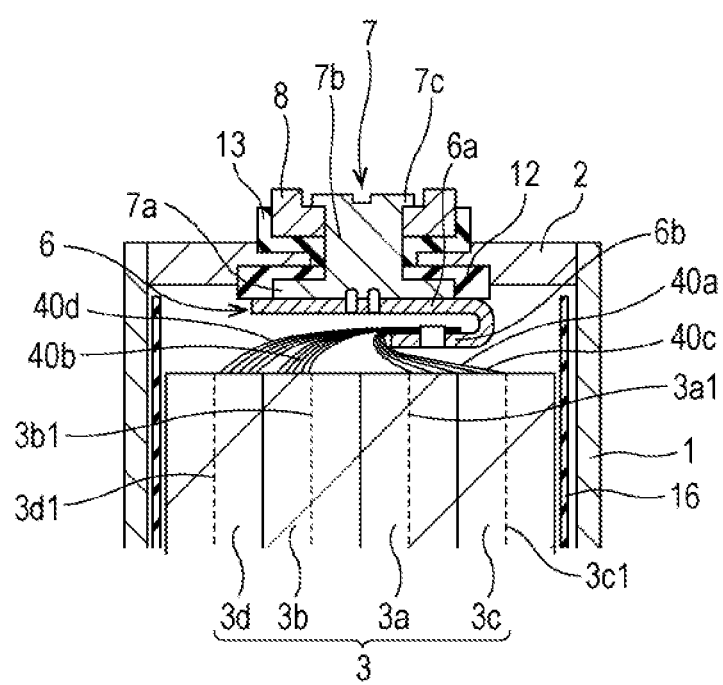
FIG. 9 is a sectional view of a region near a positive electrode terminal, taken along line IX-IX in FIG. 1.

FIG. 9 is a sectional view of a region near the positive electrode terminal 7, taken along line IX-IX in FIG. 1. In the rectangular secondary battery 20, the positive-electrode tab groups and the negative-electrode tab groups are disposed between the sealing plate 2 and the electrode body 3. Thus, a space occupied by the electrode body 3 in the battery case 100 can be increased, and the rectangular secondary battery can have high volumetric energy density.

In the rectangular secondary battery 20, the first positive-electrode tab group 40a and the third positive-electrode tab group 40c are disposed so as to be displaced from the second positive-electrode tab group 40b and the fourth positive-electrode tab group 40d in the longitudinal direction of the sealing plate 2. The first positive-electrode tab group 40a and the third positive-electrode tab group 40c, and, the second positive-electrode tab group 40b and the fourth positive-electrode tab group 40d are welded to different positions on the positive-electrode current collector 6. Thus, the number of the positive electrode tabs 4b that are stacked and welded to the positive-electrode current collector 6 at one time can be reduced, and therefore the quality of the joint between the positive-electrode current collector 6 and the positive electrode tab 4b can be improved. The same applies to the negative electrode side. Note that it is only necessary that the tab groups be disposed so as to be displaced from each other on at least one of the positive electrode side and the negative electrode side.

The positive-electrode current collector 6 includes a base portion 6a and a tab connection portion 6b. The tab connection portion 6b is folded from the base portion 6a. The base portion 6a is connected to the positive electrode terminal 7. The first positive-electrode tab group 40a, the second positive-electrode tab group 40b, the third positive-electrode tab group 40c, and the fourth positive-electrode tab group 40d are connected to the tab connection portion 6b. In FIG. 9, the base portion 6a and the tab connection portion 6b are disposed substantially parallel to each other. The tab connection portion 6b may be inclined by an angle in the range of 0 to 60 degrees relative to the base portion 6a. Preferably, the angle between the base portion 6a and the tab connection portion 6b is 45 degrees or less, more preferably 30 degrees or less, and further preferably, 15 degrees or less.

In the rectangular secondary battery 20, four rolled electrode body elements are contained in the battery case 100 in a direction such that roll axes thereof are perpendicular to the sealing plate 2. Therefore, the space in the battery case 100 can be efficiently used, and the rectangular secondary battery can have higher volumetric energy density.

First Modification

Figure 10:
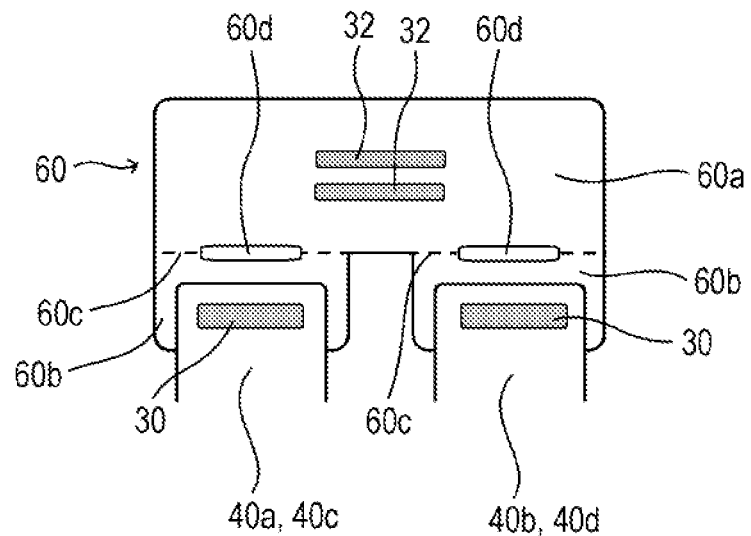
FIG. 10 illustrates a positive-electrode current collector and positive-electrode tab groups of a rectangular secondary battery according to a first modification.

A rectangular secondary battery according to a first modification differs from the rectangular secondary battery 20 described above only in the shape of the positive-electrode current collector. FIG. 10 illustrates a positive-electrode current collector and positive-electrode tab groups of the rectangular secondary battery according to the first modification. A positive-electrode current collector 60 includes a base portion 60a, and two tab connection portions 60b disposed at an end of the base portion 60a. The two tab connection portions 60b are disposed so as to be separated from each other in the longitudinal direction of the sealing plate 2. The base portion 60a of the positive-electrode current collector 60 is welded to the flange portion 7a of the positive electrode terminal 7, and thereby joints 32 are formed. The tab connection portions 60b of the positive-electrode current collector 60 are welded to the first positive-electrode tab group 40a, the second positive-electrode tab group 40b, the third positive-electrode tab group 40c, and the fourth positive-electrode tab group 40d; and thereby joints 30 are formed.

A fuse portion 60c is formed between one of the joints 30, between the first positive-electrode tab group 40a and the third positive-electrode tab group 40c and the positive-electrode current collector 60, and the joints 32, between the positive-electrode current collector 60 and the flange portion 7a of the positive electrode terminal 7. In addition, a fuse portion 60c is formed between the other joint 30, between the second positive-electrode tab group 40b and the fourth positive-electrode tab group 40d and the positive-electrode current collector 60, and the joints 32, between the positive-electrode current collector 60 and the flange portion 7a of the positive electrode terminal 7. The fuse portions 60c blow when an excessively large electric current flows through the rectangular secondary battery. The fuse portions 60c are formed by forming fuse holes 60d in the positive-electrode current collector 60. Instated of the fuse holes 60d or in addition to the fuse holes 60d, cutouts may be formed.

The positive-electrode current collector 60 is folded at the boundaries between the base portion 60a and the tab connection portions 60b. Preferably, the fuse holes 60d are formed at the boundaries between the base portion 60a and the tab connection portions 60b.

Figure 11:
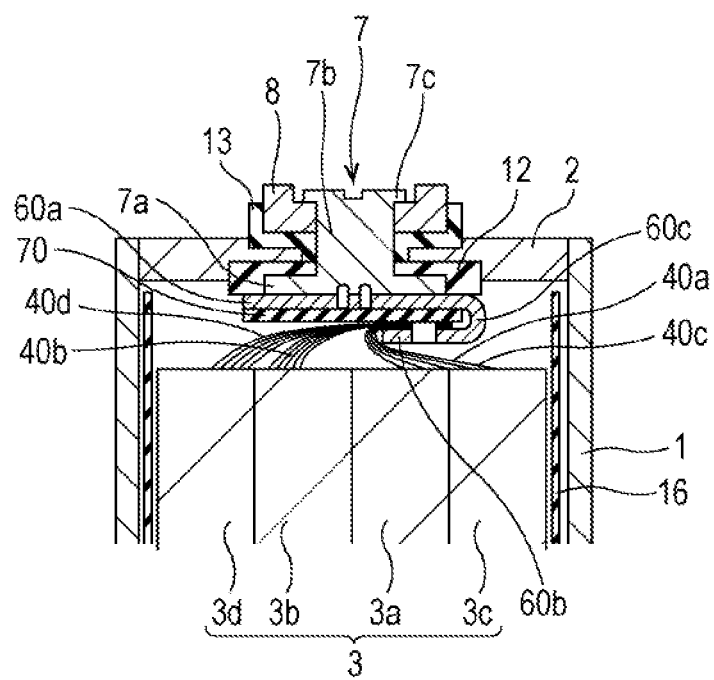
FIG. 11 is a sectional view of the rectangular secondary battery according to the first modification, corresponding to FIG. 9.

FIG. 11 is a sectional view of a region near the positive electrode terminal 7 of the rectangular secondary battery according to the first modification, taken in the transversal direction of the sealing plate 2. Preferably, an insulator 70 is disposed between the base portion 60a and the tab connection portions 60b of the positive-electrode current collector 60. The insulator 70 can prevent forming of a conduction path, which may occur if the base portion 60a and the tab connection portions 60b or the positive-electrode tab groups contact each other after the fuse portions 60c have blown. The insulator may be, for example, a resin sheet, an insulating tape, a resin plate, or a ceramic plate.

Figure 12:
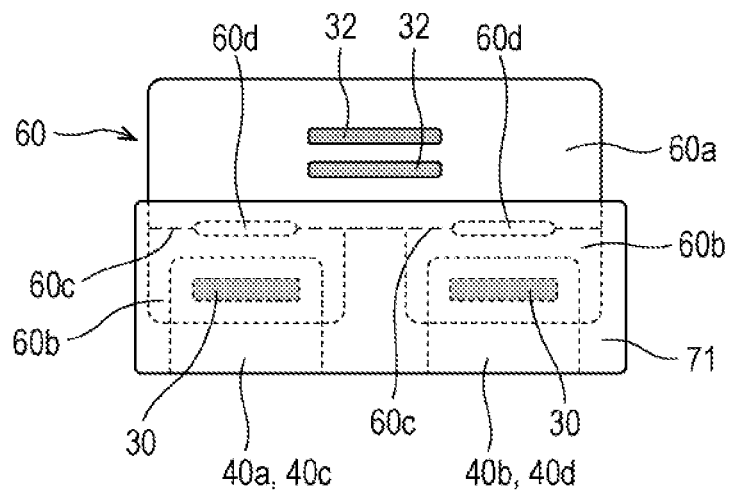
FIG. 12 illustrates the positive-electrode current collector and the positive-electrode tab groups of the rectangular secondary battery according to the first modification.

As illustrated in FIG. 12, an insulating tape 71 may be affixed to the positive-electrode current collector 60 so as to cover the fuse portions 60c of the positive-electrode current collector 60. The insulating tape 71 can suppress splashing of molten metal when the fuse portions 60c blow. Moreover, the insulating tape 71 can prevent forming of electrical connection between the base portion 60a of the positive-electrode current collector 60 and the positive-electrode tab groups or the tab connection portions 60b, which may occur after the fuse portions 60c have blown. Preferably, the insulating tape 71 is affixed also to the positive-electrode tab groups. Preferably, one insulating tape 71 is affixed so as to extend over the two tab connection portions 60b. In this case, the insulating tape 71 can prevent damage to the fuse portions 60c that may occur if the positive-electrode tab groups individually move due to vibration, an impact, or the like.

Second Modification

Figure 13:
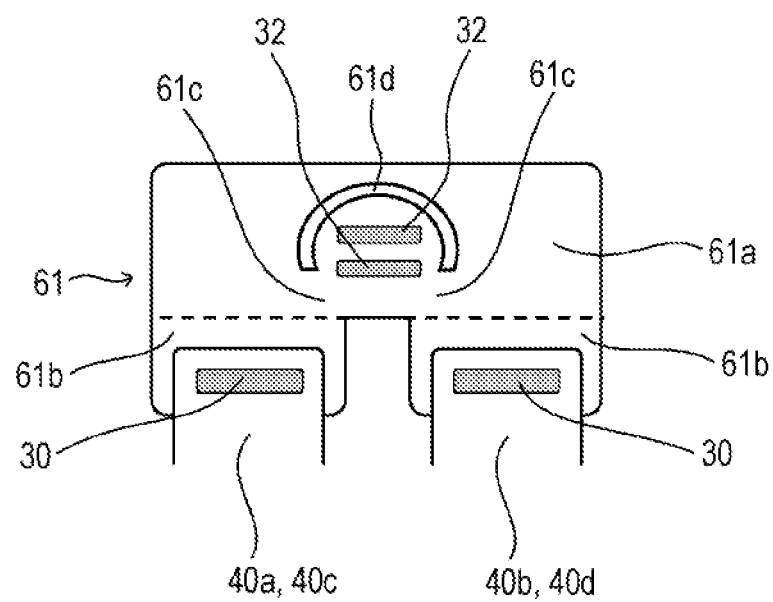
FIG. 13 illustrates a positive-electrode current collector and positive-electrode tab groups of a rectangular secondary battery according to a second modification.

A rectangular secondary battery according to a second modification differs from the rectangular secondary battery according to the first modification only in the shape of the positive-electrode current collector. FIG. 13 illustrates a positive-electrode current collector and positive-electrode tab groups of the rectangular secondary battery according to the second modification. A positive-electrode current collector 61 includes a base portion 61a, and two tab connection portions 61b disposed at an end of the base portion 61a. The two tab connection portions 61b are disposed so as to be separated from each other in the longitudinal direction of the sealing plate 2. The base portion 61a of the positive-electrode current collector 61 is welded to the flange portion 7a of the positive electrode terminal 7, and thereby joints 32 are formed. The tab connection portions 61b of the positive-electrode current collector 61 are welded to the first positive-electrode tab group 40a, the second positive-electrode tab group 40b, the third positive-electrode tab group 40c, and the fourth positive-electrode tab group 40d; and thereby joints 30 are formed.

A fuse portion 61c is formed between one of the joints 30, between the first positive-electrode tab group 40a and the third positive-electrode tab group 40c and the positive-electrode current collector 61, and the joints 32, between the positive-electrode current collector 61 and the flange portion 7a of the positive electrode terminal 7. In addition, a fuse portion 61c is formed between the other joint 30, between the second positive-electrode tab group 40b and the fourth positive-electrode tab group 40d and the positive-electrode current collector 61, and the joints 32, between the positive-electrode current collector 61 and the flange portion 7a of the positive electrode terminal 7. The fuse portions 61c blow when an excessively large electric current flows through the rectangular secondary battery. The fuse portions s61c are formed by forming fuse holes 61d.

Short-Circuit Mechanism

Preferably, a rectangular secondary battery includes a pressure-sensitive short-circuit mechanism that operates when the pressure inside the battery case becomes a predetermined pressure or higher due to overcharging or the like. When the short-circuit mechanism operates, the positive electrode plate and the negative electrode plate are short-circuited at a position outside of the electrode body. Preferably, a fuse portion, which is formed in the positive-electrode current collector or the like, is configured to blow when a large electric current flows due to short-circuiting.

Figure 14A:
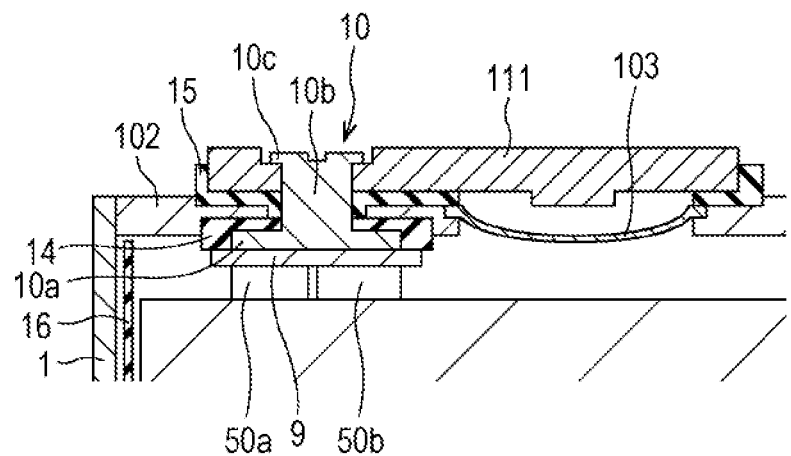
FIG. 14A illustrates the structure of a region near a negative electrode terminal of a rectangular secondary battery including a short-circuit mechanism.
Figure 14B:
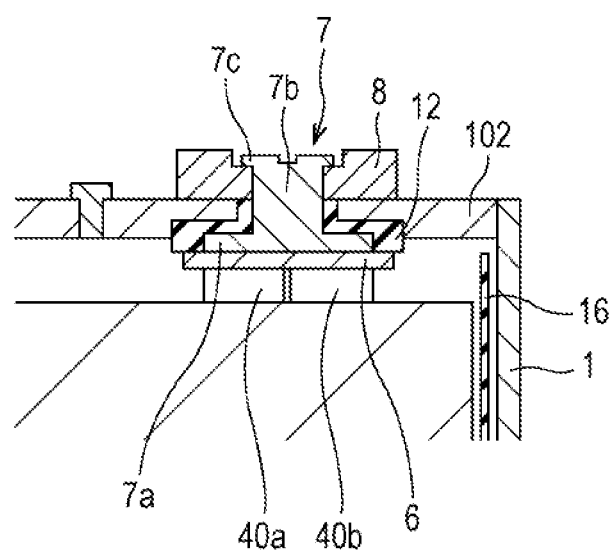
FIG. 14B illustrates the structure of a region near a positive electrode terminal of the rectangular secondary battery including the short-circuit mechanism.

FIG. 14A is a sectional view of a region near the negative electrode terminal 10 of a rectangular secondary battery including a short-circuit mechanism, taken in the longitudinal direction of a sealing plate 102. FIG. 14B is a sectional view of a region near the positive electrode terminal 7 of the rectangular secondary battery including the short-circuit mechanism, taken in the longitudinal direction of the sealing plate 102.

As illustrated in FIG. 14A, the sealing plate 102 has a deformable portion 103. The first negative-electrode tab groups 50a and the second negative-electrode tab group 50b are connected to the negative-electrode current collector 9. The negative-electrode current collector 9 is connected to a surface, facing the electrode body 3, of the flange portion 10a of the negative electrode terminal 10. The insertion portion 10b of the negative electrode terminal 10 is inserted into a through-hole in the inner insulator 14, a through-hole in the sealing plate 102, a through-hole in the outer insulator 15, and a through-hole in a negative-electrode outer conductor 111. An upset portion 10c is formed by upsetting an end portion of the insertion portion 10b. The negative-electrode outer conductor 111 extends to a position where the negative-electrode outer conductor 111 faces the deformable portion 103 of the sealing plate 102.

As illustrated in FIG. 14B, the positive-electrode outer conductor 8 is disposed directly on the sealing plate 102. Accordingly, the positive electrode plate 4 is electrically connected to the sealing plate 102 via the first positive-electrode tab group 40a and the second positive-electrode tab group 40b, the positive-electrode current collector 6, the positive electrode terminal 7, and the positive-electrode outer conductor 8. A conductor may be disposed between the positive-electrode outer conductor 8 and the sealing plate 102.

When the pressure inside the battery case becomes a predetermined pressure or higher, the deformable portion 103 of the sealing plate 102 becomes deformed so as to approach the negative-electrode outer conductor 111, and the deformable portion 103 and the negative-electrode outer conductor 111 are electrically connected to each other. Thus, the positive electrode plate 4 and the negative electrode plate 5 are electrically short-circuited via the sealing plate 102 and the deformable portion 103. Then, a short-circuit current flows through the rectangular secondary battery, and the fuse portion formed in the positive-electrode current collector 6 or the like blows. This improves the reliability of the rectangular secondary battery when the rectangular secondary battery becomes overcharged. The short-circuit mechanism operates at a pressure lower than a pressure at which the gas discharge valve 19 operates.

Third Modification

Figure 15:
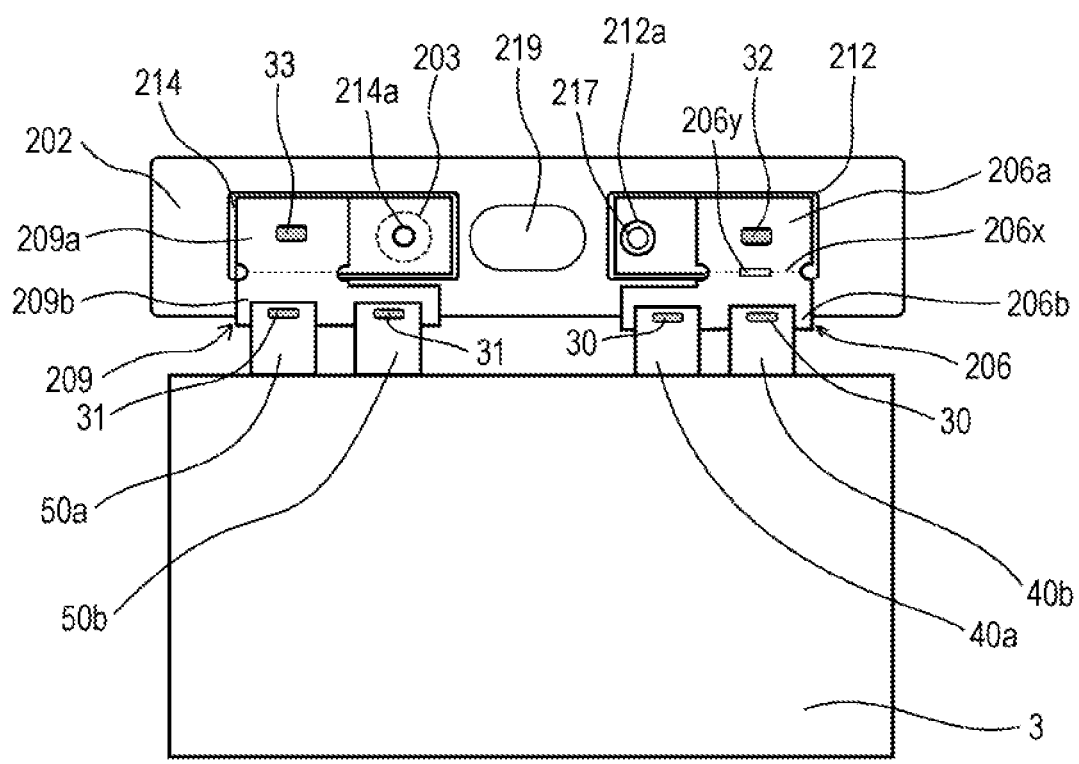
FIG. 15 illustrates a surface of a sealing plate facing an electrode body of a rectangular secondary battery according to a third modification, after the electrode body has been attached.

Referring to FIG. 15, a rectangular secondary battery according to a third modification, which includes a short-circuit mechanism, will be described. FIG. 15 illustrates a surface of a sealing plate 202 facing the electrode body 3 after components have been attached to the sealing plate 202, and the electrode body 3. The sealing plate 202 has a deformable portion 203 that becomes deformed when the pressure inside the battery case becomes a predetermined pressure or higher. The sealing plate 202 has a gas discharge valve 219 and a liquid injection hole 217.

An inner insulator 212 is disposed on the sealing plate 202, and a positive-electrode current collector 206 is disposed on the inner insulator 212. The positive-electrode current collector 206 includes a base portion 206a and a tab connection portion 206b. The base portion 206a is connected to the positive electrode terminal, and the positive electrode terminal is electrically connected to the sealing plate 202. The first positive-electrode tab group 40a and the second positive-electrode tab group 40b are connected to the tab connection portion 206b. The inner insulator 212 has an insulator opening 212a at a position corresponding to the liquid injection hole 217. The positive-electrode current collector 206 has a fuse portion 206x in a portion thereof that is on the boundary between the base portion 206a and the tab connection portion 206b and that is to become a bent portion. The fuse portion 206x is formed by forming a fuse hole 206y.

An inner insulator 214 is disposed on the sealing plate 202, and a negative-electrode current collector 209 is disposed on the inner insulator 214. The negative-electrode current collector 209 includes a base portion 209a and a tab connection portion 209b. The base portion 209a is connected to the negative electrode terminal and is electrically connected to a negative-electrode outer conductor at a position further outward from the sealing plate 202 with respect to the battery. The negative-electrode outer conductor is disposed at a position where the negative-electrode outer conductor faces the deformable portion 203. The first negative-electrode tab group 50a and a second negative-electrode tab group 50b are connected to the tab connection portion 209b. The inner insulator 214 has an insulator opening 214a at a position corresponding to the deformable portion 203. The area of the insulator opening 214a is smaller than the area of the deformable portion 203, and the inner insulator 214 has a portion that faces the deformable portion 203.

The positive-electrode current collector 206 and the negative-electrode current collector 209 are bent at portions thereof shown by broken lines in FIG. 15.

The length of the base portion 209a in the longitudinal direction of the sealing plate 202 is smaller than that of the tab connection portion 209b. The base portion 209a does not face the deformable portion 203. This structure is preferable, because this structure allows a large gap to be reliably formed between the deformable portion 203 and the negative-electrode current collector 209 and allows a gas to smoothly reach a lower part of the deformable portion 203.

In the rectangular secondary battery according to the third modification, the electrode body 3 may include the third electrode body element and the fourth electrode body element.

Insulating Sheet

Figure 16:
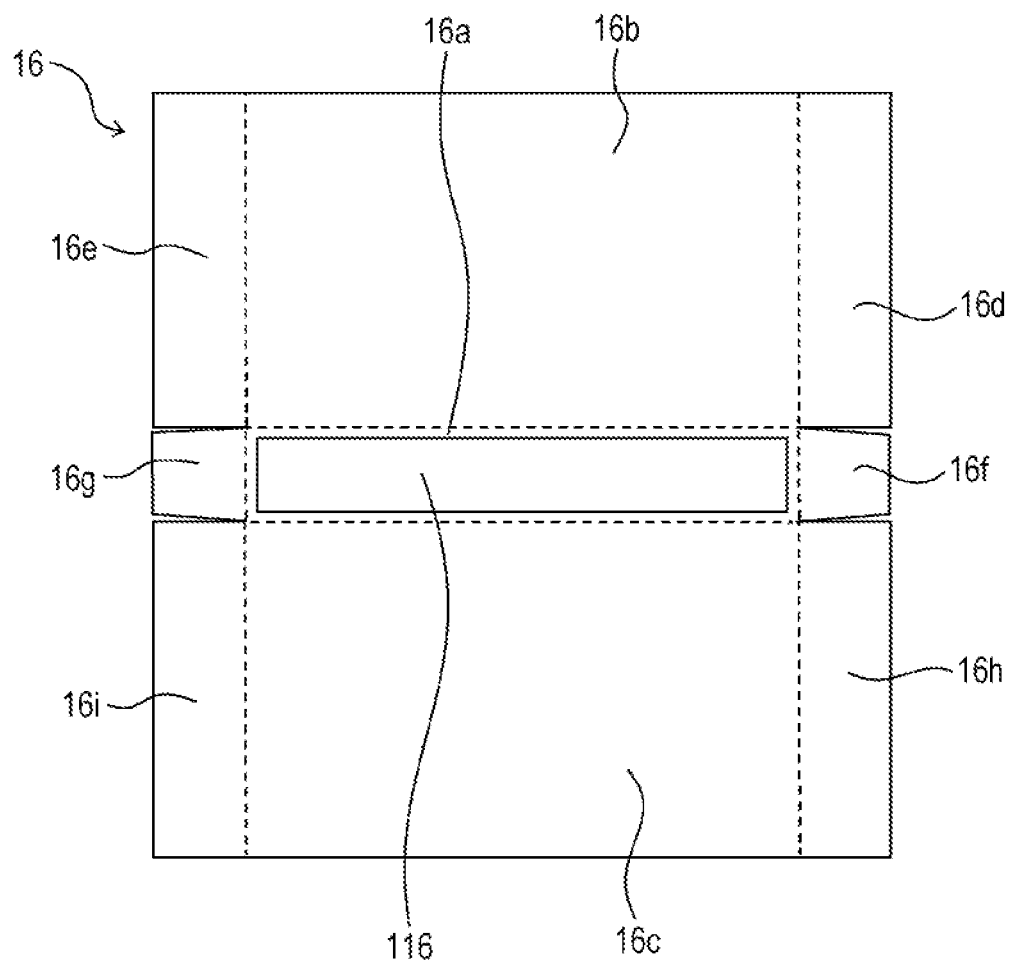
FIG. 16 is a development view of an insulating sheet.

FIG. 16 is a development view of an insulating sheet 16, which is made of a resin and which wraps the electrode body 3. When broken lines in FIG. 16 are bent, the insulating sheet 16 has a box-like shape. The electrode body 3 is disposed in the box-shaped insulating sheet 16. Preferably, the insulating sheet 16 includes a bottom portion 16a, a first side surface 16b, a second side surface 16c, a third side surface 16d, a fourth side surface 16e, a first guide portion 16f, a second guide portion 16g, a fifth side surface 16h, and a sixth side surface 16i. The bottom portion 16a is disposed between the electrode body 3 and a bottom portion of the rectangular casing 1. The first side surface 16b is disposed between the electrode body 3 and one of large-area side surfaces of the rectangular casing 1. The second side surface 16c is disposed between the electrode body 3 and the other large-area side surface of the rectangular casing 1. The third side surface 16d, the first guide portion 16f, and the fifth side surface 16h are superposed on each other and disposed between the electrode body 3 and one of small-area side surfaces of the rectangular casing 1. The fourth side surface 16e, the second guide portion 16g, and the sixth side surface 16i are superposed on each other and disposed between the electrode body 3 and the other small-area side surface of the rectangular casing 1.

A reinforcement member 116 is attached to the bottom portion 16a. Preferably, the reinforcement member 116 is an insulator that is made from a resin sheet, a resin plate, or a ceramic plate. The reinforcement member 116 may be disposed on an upper surface or a lower surface of the bottom portion 16a. Preferably, the reinforcement member 116 is attached to the bottom portion 16a by adhesion, fusing, or the like.

If the electrode body 3 includes a plurality of electrode body elements, in particular, if the electrode body 3 includes four or more rolled electrode body elements, the following may occur: when inserting the electrode body 3, which is disposed in the insulating sheet 16, into the rectangular casing 1, the bottom portion 16a of the insulating sheet 16 becomes flexurally deformed, gaps are formed between the bottom portion 16a and the third side surface 16d and between the bottom portion 16a and the fourth side surface 16e, and thereby the third side surface 16d or the fourth side surface 16e is easily caught on the edge of the opening of the rectangular casing 1. In the insulating sheet 16 illustrated in FIG. 16, the reinforcement member 116 is attached to the bottom portion 16a, and the insulating sheet 16 has the first guide portion 16f and a second guide portion 16g connected to the bottom portion 16a. Accordingly, the bottom portion 16a is not likely to become flexurally deformed, gaps are not likely to be formed between the bottom portion 16a and the third side surface 16d and between the bottom portion 16a and the fourth side surface 16e, and the third side surface 16d and the fourth side surface 16e are reliably prevented from being caught on the edge of the opening of the rectangular casing 1. This insulating sheet provides these effects also in a case where a plurality of positive-electrode tab groups are combined together and connected to the positive-electrode current collector without displacing the positive-electrode tab groups, and a plurality of negative-electrode tab groups are combined together and connected to the negative-electrode current collector without displacing the negative-electrode tab groups. Preferably, the first guide portion 16f is disposed outside of the third side surface 16d and the fifth side surface 16h (adjacent to a small-area side surface of the rectangular casing 1). Preferably, the second guide portion 16g is disposed outside of the fourth side surface 16e and the sixth side surface 16i (adjacent to a small-area side surface of the rectangular casing 1).

Other Modifications

Each of the electrode body elements is not limited to a rolled electrode body element formed by using a strip-shaped positive electrode plate and a strip-shaped negative electrode plate. The electrode body element may be a stacked electrode body element including a plurality of positive electrode plates and a plurality of negative electrode plates.

In the rectangular secondary battery 20 according to the embodiment described above, the electrode body 3 includes four electrode body elements. However, the number of electrode body elements is not limited. Preferably, the electrode body 3 includes three or more rolled electrode body elements, and more preferably, the electrode body 3 includes four or more rolled electrode body elements.

A flange portion of the terminal may be disposed further outward from the sealing plate with respect to the battery, and the terminal may be upset at a position nearer than the sealing plate to the electrode body. In this case, preferably, an end portion of a terminal that extends through a through-hole in the base portion of the current collector is upset.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A rectangular secondary battery, comprising:
    a rectangular casing that has an opening;
    a sealing plate that seals the opening;
    an electrode body that is disposed in the rectangular casing and that includes at least one positive electrode plate and at least one negative electrode plate;
    a plurality of tabs that are connected to the at least one positive electrode plate or the at least one negative electrode plate;
    a current collector that is connected to the plurality of tabs; and
    a terminal that is electrically connected to the current collector and that protrudes from the sealing plate toward an outside of the battery,
    wherein a first tab group that is composed of a plurality of the plurality of tabs and a second tab group that is composed of a plurality of the plurality of tabs are connected to the electrode body,
    wherein the first tab group and the second tab group are disposed between the sealing plate and the electrode body,
    wherein the first tab group and the second tab group are disposed so as to be displaced from each other in a longitudinal direction of the sealing plate, and
    wherein the first tab group and the second tab group are connected to different positions on the current collector.

2. The rectangular secondary battery according to claim 1, wherein the electrode body includes a first electrode body element and a second electrode body element,
    wherein the first tab group is connected to the first electrode body element, and
    wherein the second tab group is connected to the second electrode body element.

3. The rectangular secondary battery according to claim 2, wherein the first electrode body element and the second electrode body element are each a rolled electrode body element in which the at least one positive electrode plate having a strip-like shape and the at least one negative electrode plate having strip-like shape are rolled up with a separator having a strip-like shape therebetween.

4. The rectangular secondary battery according to claim 3, wherein the plurality of tabs include a plurality of negative electrode tabs that is connected to the at least one negative electrode plate, and
    wherein, in the first electrode body element, the number of the plurality of negative electrode tabs that are stacked and included in the first tab group is less than the number of layers of the at least one negative electrode plate that are stacked in a thickness direction of the first electrode body element.

5. The rectangular secondary battery according to claim 3, wherein the electrode body further includes a third electrode body element that is a rolled electrode body element to which a third tab group is connected and a fourth electrode body element that is a rolled electrode body element to which a fourth tab group is connected,
    wherein the third tab group is superposed on the first tab group and connected to the current collector, and
    wherein the fourth tab group is superposed on the second tab group and connected to the current collector.

6. The rectangular secondary battery according to claim 1, wherein a fuse portion is formed between a portion of the current collector connected to the terminal and a portion of the current collector connected to the first tab group, and a fuse portion is formed between the portion of the current collector connected to terminal and a portion of the current collector connected to the second tab group.

7. The rectangular secondary battery according to claim 1, wherein the terminal includes a flange portion and an insertion portion disposed on the flange portion,
    wherein the flange portion is disposed nearer than the sealing plate to the electrode body,
    wherein the insertion portion extends through a terminal attachment hole in the sealing plate and is upset at a position further outward from the sealing plate with respect to the battery, and
    wherein the current collector is connected to a surface of the flange portion facing the electrode body.

8. The rectangular secondary battery according to claim 1, wherein the current collector includes a base portion and a tab connection portion that is folded from an end of the base portion, and
    wherein the base portion and the terminal are connected to each other, and the tab connection portion and the tab are connected to each other.

* * * * *